United States Patent [19]

Bertoglio

[11] 4,024,361

[45] May 17, 1977

[54] METHOD OF AND MEANS FOR IDENTIFYING TEMPORARILY COACTING UNITS IN A TELECOMMUNICATION SYSTEM

[75] Inventor: Ottavio Bertoglio, Turin, Italy

[73] Assignee: CSELT - Centro Studi e Laboratori Telecomunicazioni SpA, Turin, Italy

[22] Filed: Aug. 29, 1975

[21] Appl. No.: 609,071

[30] Foreign Application Priority Data

Aug. 29, 1974 Italy .................. 69637/74

[52] U.S. Cl. .................. 179/175.2 C; 179/15 BF
[51] Int. Cl.² .................. H04M 3/22
[58] Field of Search ............ 179/175.2 R, 175.2 C, 179/18 FG, 18 FH, 15 BF; 340/172.5

[56] References Cited

UNITED STATES PATENTS

| 3,400,228 | 9/1968 | Bubber | 179/175.2 R |
| 3,435,159 | 3/1969 | Brooks | 179/175.2 R |
| 3,626,383 | 12/1971 | Oswald | 179/175.2 R |

Primary Examiner—David L. Stewart
Attorney, Agent, or Firm—Karl F. Ross; Herbert Dubno

[57] ABSTRACT

Selectively seizable operating units (e.g. switches, lines or coders), forming part of different groups A, B etc. of identical units, are monitored to detect any change of state in a unit of, say, group A followed within a predetermined test period by a change of state of a unit of, say, group B. From the occurrence of the second transition, and in the absence of a switchover of any other unit of either group during the test period, an operative association is recognized between the two units in which these transitions were consecutively detected. The monitoring of all the units under surveillance is carried out in time-division sequence by cyclically scanned sensors individually assigned to them.

12 Claims, 6 Drawing Figures

METHOD OF AND MEANS FOR IDENTIFYING TEMPORARILY COACTING UNITS IN A TELECOMMUNICATION SYSTEM

FIELD OF THE INVENTION

My present invention relates to a method of and means for identifying temporarily coacting units of central-office equipment of a telephone or other telecommunication system wherein two or more seizable operating units of different classes intervene in the establishment of a connection, each unit being selected from a group of substantially identical units in a random or preferential manner. Such operating units include, for example, junctors, registers, encoders, decoders, line finders, selectors and trunks.

BACKGROUND OF THE INVENTION

It is frequently desirable, e.g. for the detection of malfunctions or for traffic surveys, to identify the units of different groups which are temporarily associated in a given connection. A possible way of accomplishing this, which may be described as a deterministic method, involves the introduction of a signaling criterion into the first unit called into service and the subsequent tracing of that criterion in all the other units engaged in the connection. Such a monitoring system, using for example individual sensors for all the units involved, is relatively complex and costly.

OBJECTS OF THE INVENTION

The general object of my present invention, therefore, is to provide an alternate way of identifying such participating units which, at the risk of being ineffectual in a limited number of instances, provides the information in a considerably more economical manner and without overloading existing equipment.

A related object is to provide a relatively simple circuit arrangement for identifying coacting units of the aforedescribed type temporarily associated with one another in a telecommunication system.

SUMMARY OF THE INVENTION

A monitoring network according to my present invention, designed for the surveillance of equipment in a telecommunication system, utilizes an approach which may be termed a statistical method and which is based upon the principle that, in the interaction of two associated units of different kinds belonging to respective groups, an operation of a participating unit of the first group will probably entrain, within a predetermined time interval, an operation of an associated unit of the second group. Thus, if the detection of a change of state of a unit $X_i$ of the first group is followed within such a time interval by a change of state of a unit $Y_j$ of the second group, and provided of course that the two types of units are associable with each other in the sense here considered, the inference may be drawn that an operative association actually exists.

The limitations of this statistical method lie in the possibility that several units X and/or several units Y change state within the operative interval so as to render uncertain the correlation existing therebetween. In many instances, however, the coacting units exchange signals more than once so that several test periods are available in which their association can be recognized.

In general, if $p_X$ and $p_Y$ denote the probabilities of a single unit X and a single unit Y changing state within the operative interval, the probability of a nonambiguous association between two such units is $p_X p_Y$. Evidently, that probability will vary inversely with the length of the operative interval and with the traffic density; it also depends, of course, on the type of correlation involved, i.e. on the frequency of the occurrence of a particular association in the normal operation of the system.

In some instances this probability will amount to a virtual certainty, as for example in the case of an electromechanical telephone exchange in which a marker intervenes in the establishment of a connection between two units. Thus, detection of readiness signals exchanged between two units so interconnected reveals practically unequivocally their association since the marker cannot establish more than one connection at a time. On the other hand, inasmuch as such a connection may be terminated at any moment, the detection of release signals from two such units does not invariably correlate them with each other.

A circuit tester embodying my invention, operating in accordance with the aforedescribed statistical method, includes first monitoring means for detecting a change of state in any one unit forming part of a group of substantially identical units of a first type, second monitoring means for detecting a change of state in any one unit forming part of a group of substantially identical units of a second type associable with units of the first type, and timing means for establishing a test period in which the successive detection of changes of state by the first and second monitoring means gives rise to an output signal identifying the units involved.

As more fully described hereinafter, the monitoring of the several units of each group advantageously takes place with time-division multiplexing, each unit of a group being allotted a respective time slot in a recurrent cycle in which that unit can be identified by its time position within the cycle. The current operating state of any such unit and the character of its group may be stored, in suitably coded form, in a memory cell upon a detection of a change of state in a unit of one group, the storage being maintained for a time (consistent with the aforementioned test period) sufficient to permit the detection of a change of state in a possibly associated unit of a different group. The associability of successively monitored groups may be determined from the contents of a permanent store to which the necessary data are supplied by a scanner in each time slot.

BRIEF DESCRIPTION OF THE DRAWING

The above and other features of my invention will now be described in detail with reference to the accompanying drawing in which.

SPECIFIC DESCRIPTION

Figure 1:
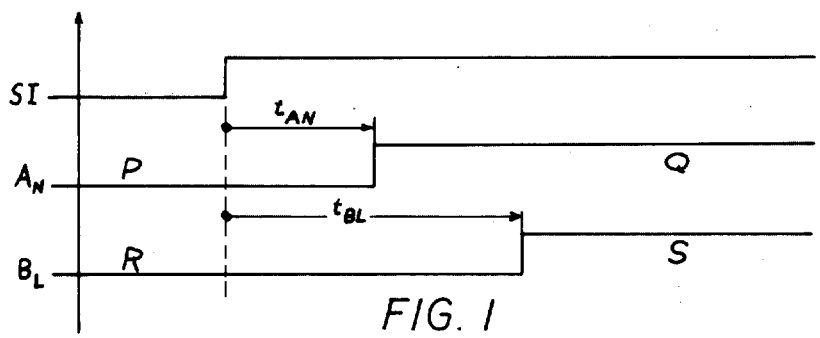
FIGS. 1, 2 and 3 are sets of graphs serving to explain the principle of statistic surveillance underlying my present invention.

In FIG. 1 I have illustrated the times of occurrence of certain events in a telecommunication system of the type here considered, i.e. the arrival at an instant $t_{s1}$ of a trigger signal SI (e.g. for the initiation of a telephone connection) at a central office, the switchover of a first unit $A_N$ from a quiescent state P to an actuated state Q in response to that signal, and a similar switchover between states R and S of a unit $B_L$ temporarily controlled by unit $A_N$. The delay between signal SI and the switchover of unit $A_N$ has been designated $t_{AN}$; the corresponding delay for unit $B_L$ has been indicated at $t_{BL}$.

Figure 2:
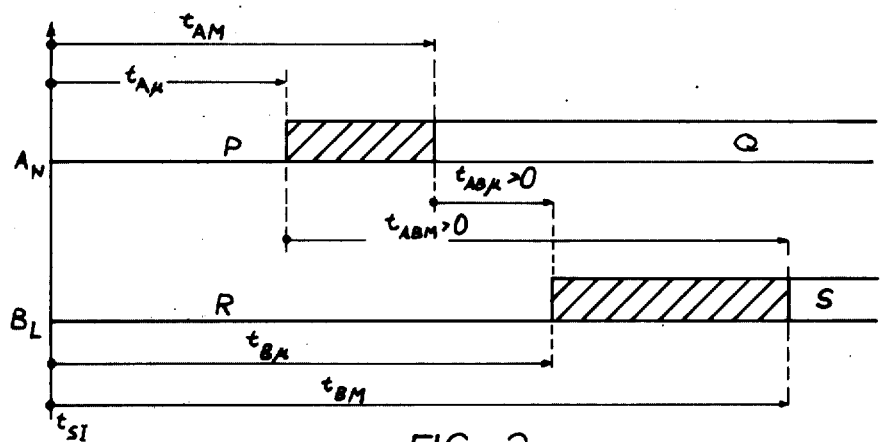
Figure 3:
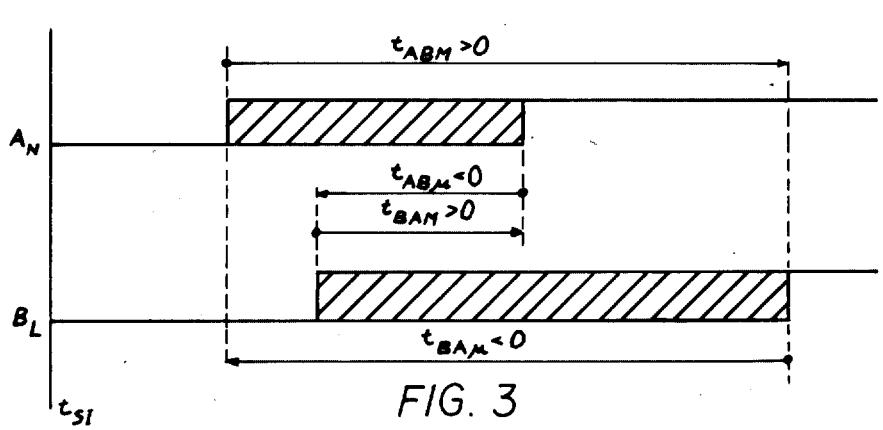

The delays $t_{AN}$ and $t_{BL}$ are subject to certain variations due in part to manufacturing tolerances of the components involved and in part to changes in external conditions such as ambient temperature and supply voltage. It therefore behooves to establish for each of these delays a minimum and a maximum length. In FIGS. 2 and 3 the lower limits for delays $t_{AN}$ and $t_{BL}$ have been designated $t_{A\mu}$ and $t_{B\mu}$, respectively; the corresponding upper limits are shown at $t_{AM}$ and $t_{BM}$. In FIG. 2 the switchover of unit $A_N$ invariably precedes that of unit $B_L$; in FIG. 3 the periods of possible occurrence of the two events (indicated by hatching) overlap.

Since the instant $t_{SI}$ of the arrival of the trigger signal cannot always be determined with certainty, the only physically measurable parameters may be the time lapse $t_{AB}$ between the occurrences of the two switchovers. This time lapse will range between two limiting values $t_{AB\mu} = t_{B\mu} - t_{AM}$ and $t_{ABM} = t_{BM} - t_{A\mu}$. Under the nonoverlapping conditions illustrated in FIG. 2, the delay $t_{AB}$ will always be positive (or zero in a limiting case); thus, $t_{AB\mu} \geq 0$ and $t_{ABM} > 0$. With overlap as per FIG. 3, we may have $t_{AB\mu} < 0$ and $t_{ABM} > 0$ which corresponds to $t_{BAM} > 0$ and $t_{BA\mu} < 0$, the term $t_{BA}$ representing the time lapse between switchovers of units $B_L$ and $A_N$ if the former should precede the latter.

With further relative shifting of the hatched ranges in FIG. 3 we may arrive at the reverse condition of $t_{BA\mu} \geq 0$ and $t_{BAM} > 0$.

The limiting values of $t_{AB}$ (or $t_{BA}$) are given from the system parameters and may be regarded as invariant. Since the probability of a switchover near the upper and lower range limits is very low, we may shorten these ranges and thereby reduce the operative interval $t_{ABM} - t_{AB\mu}$ or $t_{BAM} - t_{BA\mu}$.

If a timer such as a counter of clock pulses is started whenever a unit in the leader group (A) changes state, this timer can measure a definite interval for the occurrence of a change of state in a unit of the follower group (B) if the two groups operate nonoverlappingly as shown in FIG. 2. If overlap is present, as in FIG. 3, units of either group may be in leading position; thus, the timers would then have to start upon a switchover of any unit in group A and upon a switchover of any unit in group B to establish respective intervals within which a unit of the other group must change state in order to reveal an association.

Taking into account the possibility of negative values for the lower limit $t_{XY\mu}$ of an operative interval for the detection of a correlation between two units X and Y (either of which might be a unit such as $A_N$ or $B_L$ in FIG. 3), we can specify a test period $t_Y$, starting immediately after a switchover of the leader unit X, during which a switchover of the follower unit Y must occur if the two units are operatively associated or correlated. This test period $t_Y$ is given by $$t^*_{XY} < t_Y < t_{XYM} \qquad (1)$$

where $$t^*_{XY\mu} = \frac{t_{XY\mu} - |t_{XY\mu}|}{2} \qquad (2)$$

Equation (2) states that $t^*_{XY\mu}$ is either 0 (for negative values of $t_{XY\mu}$) or equal to $t_{XY\mu}$ (for positive values thereof).

Figure 4:
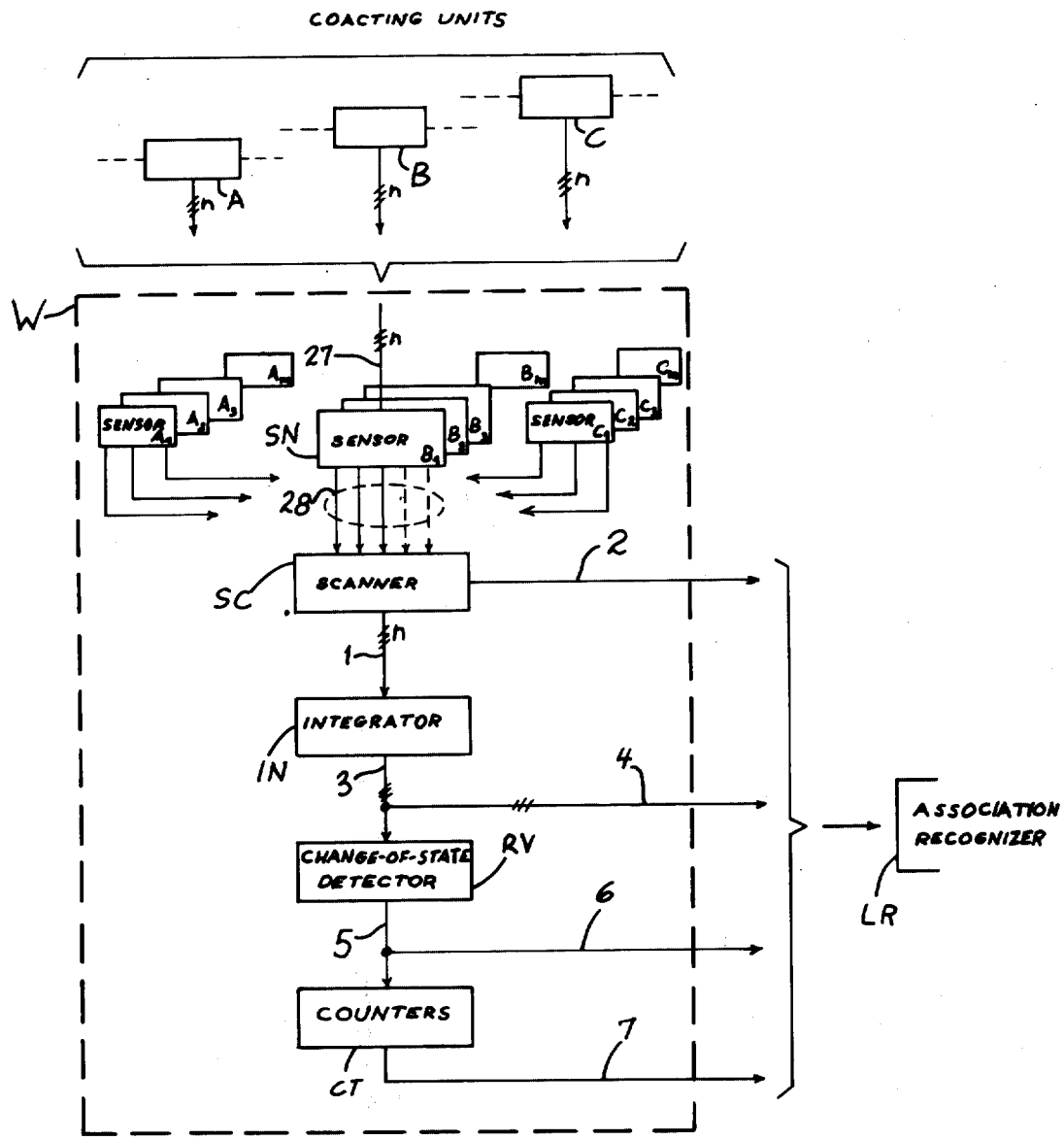
FIG. 4 is a block diagram showing the basic structure of a circuit tester according to my invention.

In FIG. 4 I have shown diagrammatically several groups A, B, C of coacting units, included in a telephone exchange or the like, which may be selectively associated to establish a connection as discussed above. A monitoring circuit W periodically scans all these units to determine their operating conditions and any change of state occurring therein. Circuit W comprises a multiplicity of sensors SN each connected to a respective unit via a multiple 27 of $n$ conductors, $n$ being the number of possible states which any of these units may assume. Thus, one set of sensor SN checks the units $A_1, A_2, A_3 \ldots A_m$ of group A; two other such sets of sensors are provided for units $B_1, B_2, B_3 \ldots B_m$ of group B and for units $C_1, C_2, C_3 \ldots C_m$ of group C. Naturally, there may be additional groups of operating units and corresponding sets of sensors which have not been illustrated.

Each sensor SN works by way of a set of leads 28 into a scanner SC which activates these sensors in a predetermined cyclic sequence, with successive scanning of all the sensors of one set before a changeover to those of another set. The order of scanning of the several sets need not necessarily correspond to the sequence in which the units of the respective groups can be operatively associated. Thus, whereas the identity of each of the $m$ units of a group is determined by its time position in the scanning cycle, the group itself is identified by a code signal emitted on an output multiple 2 of scanner SC. Another output multiple 1 of scanner SC transmits the current state of any units to a conventional integrator IN whose preferably adjustable time constant is so chosen as to exclude spurious variations in operating conditions. Integrator IN has an output multiple 3 leading to a change-of-state detector RV which in turn feeds a set of acyclic counters CT, one for each unit, via a lead 5; multiple 3 has an outgoing branch 4. Any change of state determined by detector RV sets the corresponding counter CT to zero and also emits a signal on an outgoing branch multiple 6. Multiples 2, 4 and 6 as well as an output multiple 7 of each counter CT extend to an association recognizer LR described hereinafter with reference to FIG. 5.

Figure 5:
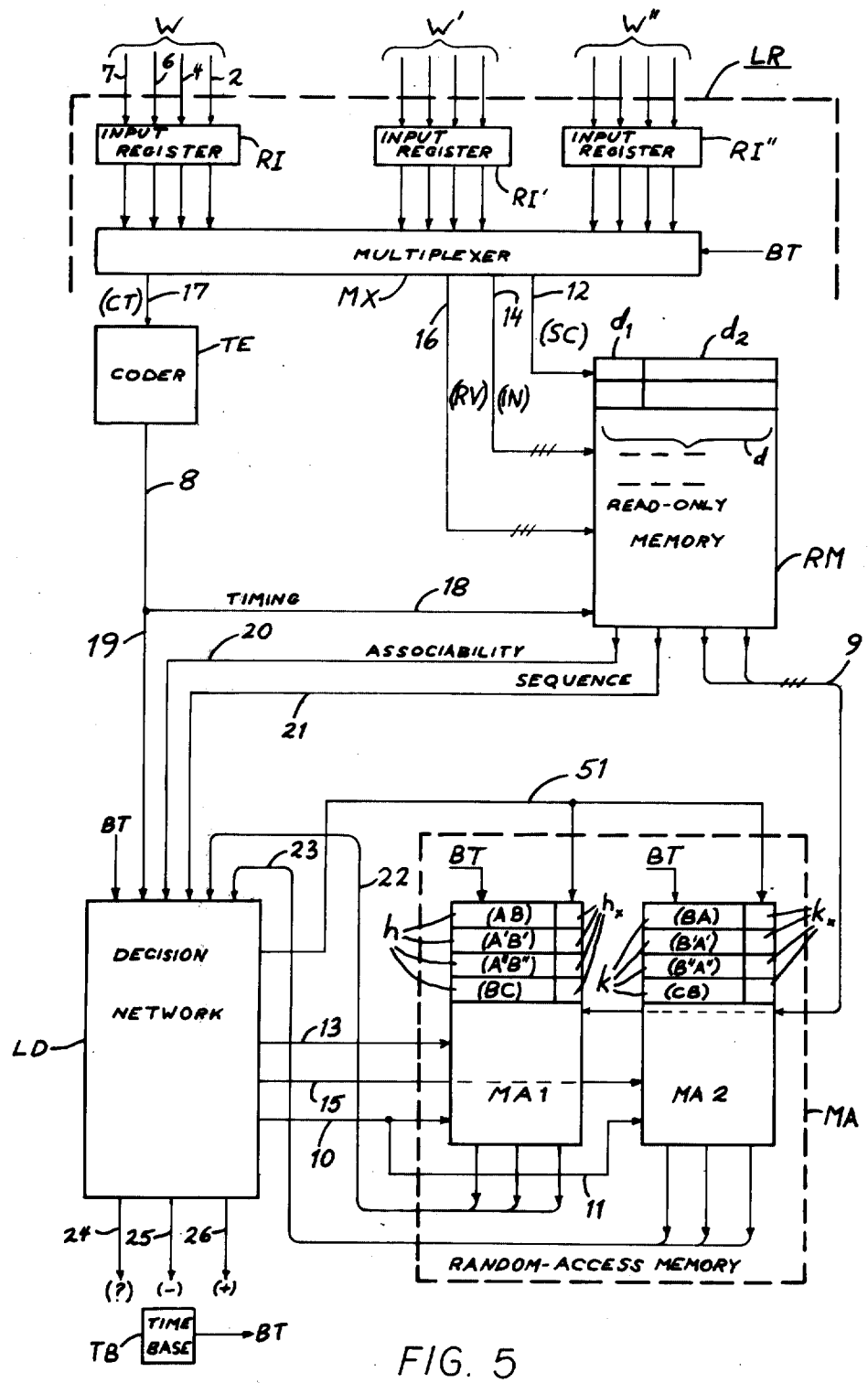
FIG. 5 is a more detailed block diagram of an association detector included in the system of FIG. 4.

In FIG. 5 the association recognizer LR has been shown connected to the outputs of several monitoring circuits W, W', W'', each of the type illustrated in FIG. 4. It is assumed that the number of units per class is so large that it would be inconvenient to scan them all in succession, each class being therefore split into several groups (e.g., A, A', A'' or B, B', B'') scannable simultaneously by the respective monitors. Each monitor W, W', W'' feeds a respective input register RI, RI', RI'' to which its outputs 2, 4, 6 and 7 are connected; the contents of the register are updated during every scanning cycle of the corresponding monitor. The change-of-state detector RV of the monitor comprises a multiplicity of storage elements, one for each unit of all the groups assigned to it, which preserves the state of operation of the respective unit from one cycle to the next and is therefore capable of emitting on the corresponding output lead of multiple 5, 6 a signal indicating a switchover, this signal being entered in a corresponding section of register RI. Each counter CT is resettable to zero by a switchover signal on a corresponding lead 5 and then counts scanning cycles in which no switchover occurs, the count being automatically arrested at a predetermined limiting value large enough to measure a time exceeding the above-discussed test period. This test period may be different for the various combinations of units A/B, A/C, B/C etc; for the sake of simplicity, the following description is limited only to the two groups A and B which are characterized by a test period analogous to the period $t_Y$ defined by inequality (1).

Figure 6:
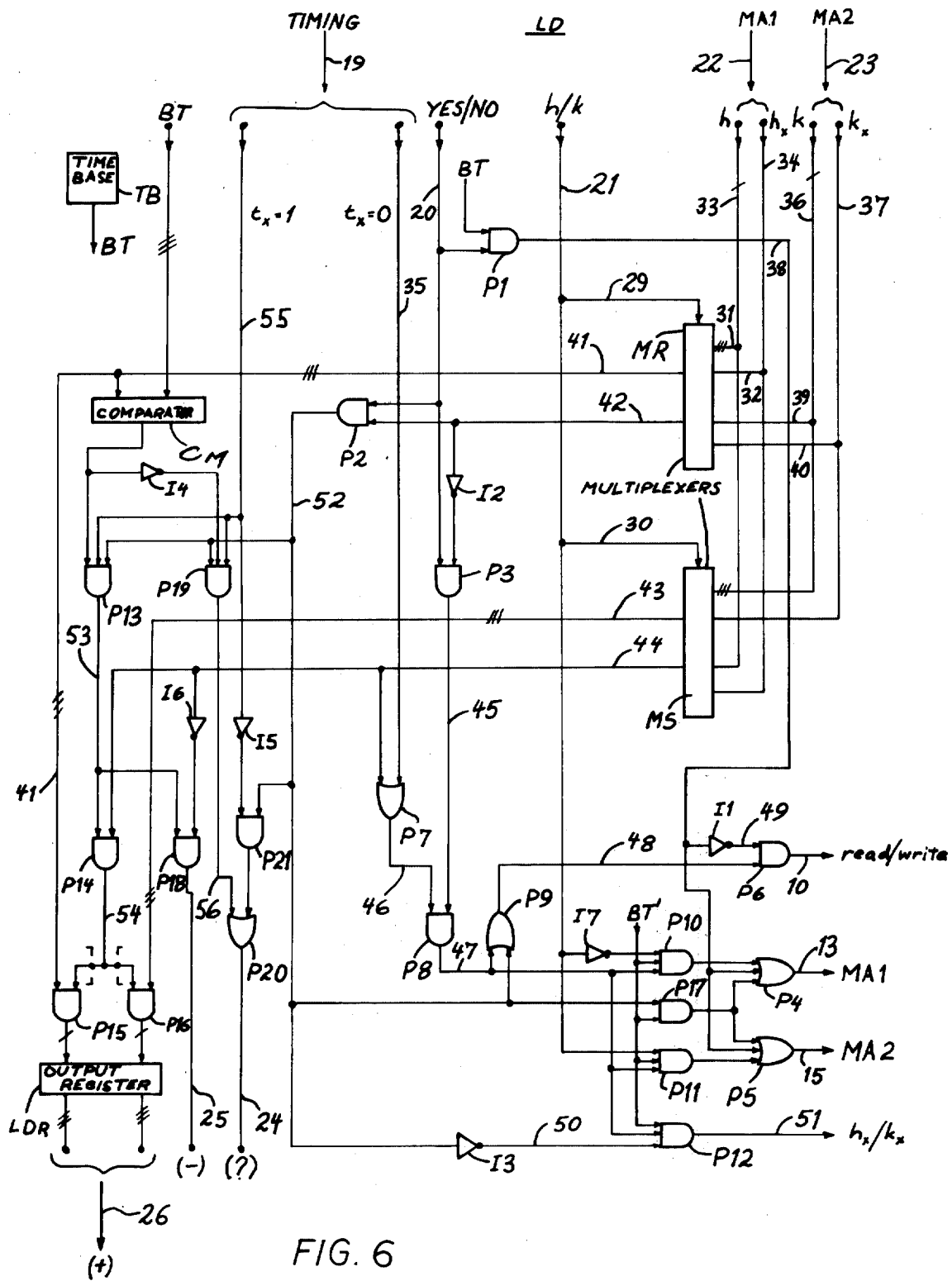
FIG. 6 shows details of a decision network illustrated in block form in FIG. 5.

Thus, each input register RI, RI', RI'' receives on its several input multiples 2, 4, 6 and 7 the group designations of the units scanned, codes representing their operating states, switchover signals indicative of the change of state of any such unit, and the contents of their respective counters CT. These data are sampled periodically, under the control of clock pulses BT, with the aid of a multiplexer MX which reads out concurrently the data from input multiples 2, 4, 6, 7 thereof into respective output multiples 12, 14, 16 and 17, with consecutive reading of all registers during each scanning cycle. Multiples 12, 14 and 16 terminate at a read-only memory RM; multiple 17 extends to a coder TE whose output 8, having branches 18 and 19, comprises two leads 35, 55 (FIG. 6). Lead 35 is energized whenever the sampled counter has a reading less than its maximum count indicating that a test period $t_Y$ initiated by a change of state of a unit X is running; lead 55 is energized at the end of test period $t_Y$, i.e. when the counter has reached its final position. It is assumed in this instance that the conditions of FIG. 3 apply, i.e. that possible switchovers of units in groups A and B fall within overlapping ranges, so that the test period starts immediately after the switchover. Conductor branch 18 also terminates at memory RM.

The various signal combinations appearing in the inputs 12, 14, 16, 18 of memory RM constitute the addresses of a multiplicity of stages $d$, one for each signal combination which could facilitate the recognition of an association as more fully described hereinafter. Each memory stage $d$ is divided into two sections $d_1$ and $d_2$, section $d_1$ containing a single bit which indicates whether or not a single combination of interest in this context is present. Section $d_2$ contains the identifications of the groups potentially involved in such an association, e.g. A/B in the presence of signals indicating that a change of state in a unit of group A has an effect on a unit of group B or vice versa. These identifications are transmitted on an output multiple 9 of memory RM, together with the time positions of the monitored units, in its scanning cycle as determined from signals on multiple 14 to a random-access memory MA divided into identical halves MA1 and MA2 for the storage of the identification codes of leader and follower units, respectively. Two other output leads 20 and 21 of memory RM extend along with branch 19 of coder output 8 to a logical decision network LD with an output multiple 26 confirming the establishment of an association (+), an output lead 25 signaling the absence of such correlation (−), and an output lead 24 indicating an inconclusive condition (?) in which no correlation can be definitely determined.

Each half MA1, MA2 of memory MA includes a multiplicity of cells $h$ and $k$, respectively, each of these cells being provided with a storage element $h_x$, $k_x$ for a discriminating bit designed to indicate whether the respective cell is to be considered busy or idle. The uppermost cells $h(AB)$ and $k(BA)$ have been allocated to the group combination A/B. The presence of an idleness bit in store $h_x$ or $k_x$ eliminates the necessity for clearing the entire cell when its contents are no longer needed and before the next reloading operation as more fully described hereinafter. Reading and writing commands are transmitted to components MA1 and MA2 from network LD via a lead 10, these components being individually enabled by the energization of a respective lead 13 or 15 also originating at that network. A futher output lead 51 of network LD controls the entry of a discriminating bit at $h_x$ and $k_x$. The contents of cells $h$ and $k$ can be read out to network LD via respective multiples 22 and 23.

Output lead 20 of memory RM carries to network LD a bit indicating whether or not a condition of associability exists in any given time slot; this condition is affirmed or negated by the energization or de-energization of lead 20, i.e. by a logical value 1 or 0 of the transmitted bit, respectively. If the memory RM is addressed by a combination of input signals indicating that the unit just switched in group A, for instance, may coact with a unit in group B, or vice versa, then the presence of a logical 0 on lead 21 indicates that a unit being scanned plays the part of the leader whereas with a logical 1 it acts as the follower.

If groups A, A', A'' monitored by circuits W, W', W'' coact only with corresponding groups B, B', B'', then separate cells $h$ and $k$ of memory halves MA1, MA2 must be allocated to them as indicated at (A'B')/(B'A') and (A''B'')/(B''A''). Other cells of memory MA serve for additional groupings such as B/C. In each instance the state of energization of lead 21 indicates the sequence of expected switchover between the units so paired. Provision may also be made for correlating an entire class (e.g. C) with only some of the groups (e.g. A, A') of another class.

The logical decision network LD, shown in detail in FIG. 6, includes a comparator CM, an output register LDR, AND gates P1 – P3, P6, P8, P10 – P19, P21, OR gates P4, P5, P7, P9, P20, inverters I1 – I7, and multiplexers MR, MS. Leads 10, 13, 15, 24, 25 and 51 emanate from gates P6, P4, P5, P20, P18 and P12, respectively. Output 26 is a multiple composed of a number of stage leads of register LDR sufficient to identify the two units between which an association has been recognized. AND gates P15 and P16 are also multipled.

OPERATION

AND gates P1, P2 and P3 have inputs tied to lead 20 and therefore are blocked as long as this lead is without voltage, i.e. in the absence of an event capable of indicating an operative association between two units. Such an event always involves a voltage change in the output of coder TE, i.e. a transition from timing condition $t_x=0$ (energization of lead 35) to timing condition $t_x=1$ (energization of lead 55) or vice versa. The first transition occurs, as explained above, upon a switchover of a unit X with consequent resetting of the corresponding counter CT; the second transition takes place when the counter has run its course, having measured the test period $t_Y$ during which a follower unit Y is expected to respond. It should be noted, though, that not every such transition necessarily involves an association test which is marked by the accompanying energization of lead 20.

If a test is indicated by the signal configuration addressing the memory RM, a logical 1 on lead 20 opens the AND gate P1 to the passage of a clock pulse BT from time base TB to energize a lead 38. This results in the conduction of OR gates P4, P5 and in the blocking, via inverter I1 and a lead 49, of AND gate P6 so that leads 13 and 15 carry voltage whereas lead 10 does not. That signal combination represents a reading command for the cells h and k of memory halves MA1, MA2 identified by the address then appearing on the output multiple 9 of memory RM, here assumed to be cells labeled h(AB) and k(BA) whose selection is determined by a switchover of a unit $A_N$ in group A. The contents of these cells therefore appear on outputs 22 and 23, respectively, shown to consist of multiples 33, 36 for the unit-identification code and leads 34, 37 for the discriminating bits from the corresponding storage elements $h_x$, $k_x$.

It is assumed that at this point, representing the beginning of a test period, memory cells h(AB) and k(BA) are idle, their storage elements $h_x$ and $k_x$ carrying each a bit 0. Let us further suppose that lead 21 is de-energized, indicating that the unit $A_N$ is the leader. Branches 29 and 30 of lead 21 then maintain the multiplexers MR and MS in positions in which outputs 41, 42 of multiplexer MR are switched to branches 31, 32 of connections 33, 34 whereas outputs 43, 44 of multiplexer MS are switched to connections 36, 37. Thus, the contents of cells h(AB) and k(BA) respectively pass to outputs 41, 42 and 43, 44; in view of the idle state of these cells, leads 42 and 44 are without voltage. The two output multiples 41 and 43 of these multiplexers extend to respective inputs of the two sets of AND gates P15 and P16.

Inverter I2 now renders AND gate P3 conductive to energize, via a lead 45, one of the inputs of AND gate P8 whose other input receives voltage from lead 35, the latter being energized at this time by the coder TE. This energizes an output lead 47 of gate P8 extending to respective inputs of OR gate P9 and AND gates P10 – P12. An output lead 48 of gate P9 applies voltage to one input of AND gate P6 whose other input, tied to lead 49, is still de-energized as long as the clock pulse BT persists. A delayed replica BT′ of this clock pulse reaches respective inputs of AND gates P10 – P12 and P17. Inverters I7 and I3 apply voltage to other inputs of AND gates P10 and P12 whose third inputs are energized via lead 47 so that lead 13 is connected to potential via OR gate P4, as is lead 51, at an instant when the disappearance of the clock pulse in the input of gate P1 renders the gate P6 conductive to change the signal on lead 10 from a reading to a writing instruction. This results in the loading of cell h(AB) of memory half MA1 with the new unit-identification code supplied by multiple 9, on the basis of the information present on multiple 12, and with the new discriminating bit of logical value 1 from lead 51.

Let us now assume that the next event affecting the association of groups A and B, occurring within the test period measured by the corresponding counter, is a switchover of a unit $B_L$ in group B which is recognized by memory RM as an association-signifying transition resulting in another energization of lead 20. Since unit $B_L$ is in the position of follower, lead 21 now carries voltage so that output 23 of memory half MA2 is now switched via multiplexer MR to conductors 41, 42 whereas output 22 of memory half MA1 is connected by way of multiplexer MS to conductors 43, 44. Since element $k_x$ of cell k(BA) still contains a 0 bit, lead 42 remains de-energized and the same operations as before take place, except that AND gate P11 now conducts during the writing phase in lieu of gate P10 so that the unit-identification code on multiple 9 and the "busy" bit on lead 51 are now inscribed in that cell of memory half MA2.

When the counter CT (FIG. 4) of unit $A_N$ reaches its full capacity, coder TE reverses its output so that lead 55 is now energized in place of lead 35. This coincides with voltage on lead 20 which, with lead 42 carrying the 1 bit of storage element $k_x$ of cell k(BA), renders AND gate P2 conductive to energize a lead 52 and remove voltage from an input lead 50 of AND gate P12 in the output of inverter I3. Comparator CM determines whether the time position of the unit now scanned ($A_N$) matches the identification code previously entered in cell h(AB) of memory MA1 whose output multiple 22 is now again connected via multiplexer MR to conductors 41, 42, switching lead 21 being de-energized at this time. For this purpose the comparator includes a cyclic counter, not shown, which is stepped by the clock pulses BT and whose count is compared with the relevant part of the signal combination on multiple 41. Since it is assumed that the unit $A_N$ being scanned is the one whose identity was entered in memory half MA1 in the first writing phase, comparator CM will have an output which energizes one of the inputs of AND gate P13 whose other two inputs receive voltage from leads 52 and 55. The resulting conduction of gate P13 energizes an input lead 53 of AND gate P14 which is already unblocked by the discriminating bit from element $k_x$ of cell k(BA) appearing on lead 44 in the output of multiplexer MS. An output lead 54 of gate P14, connected in parallel to respective inputs of all gates P15 and P16, thereupon opens these gates to the passage of the identification codes of units $A_N$ and $B_L$ from multiples 41 and 43 into register LDR whose own output multiple 26 reads out these codes to a nonillustrated processor. This completes the operation of identifying, by the statistical method according to my invention, two coacting units participating in the establishment of a telephone connection.

Suppose, now, that the end of the test period occurs without a switchover of a unit of group B so that lead 44 is not energized when AND gate P13 conducts. In this case the AND GATE P18 is unblocked, via inverter I6, in place of AND gate P14 so that an output signal (−) indicative of a lacking association appears on lead 25.

In both these instances, voltage on lead 52 energizes input lead 48 of AND gate P6 via OR gate P9 as well as an input of AND gate P17 working into OR gates P4 and P5. The occurrence of a delayed clock pulse BT′, again coinciding with a writing signal on lead 10, then energizes the two enabling leads 13 and 15 for memory halves MA1 and MA2 at a time when AND gate P12 is blocked by the absence of voltage on lead 50. Thus, a discriminating bit 0 is now entered in the elements $h_x$ and $k_x$ of both cells h(AB) and k(BA), thereby re-establishing the condition initially assumed.

The energization of lead 52, with resulting idling of both memory cells h(AB) and k(BA), will also occur if either a second unit in group A or a second unit in group B changes state during the test interval initiated by a switchover of unit $A_N$. In either instance there will be voltage on lead 42 so that AND gate P2 conducts upon the energization of lead 20. During the test period ($t_X=0$), with lead 55 de-energized, inverter 15 has an output unblocking the AND gate P21 so that lead 24 is energized via OR gate P20. If the test period has passed ($t_X=1$), the comparison check in component CM will fail and inverter 14 will cause AND gate P19 to conduct in lieu of gate P13 to energize its output lead 56 and thereby again generate an inconclusiveness signal (?) on lead 24, via OR gate P20.

A similar situation arises if two further units of group A (or any even number of such units) change state in the course of a test period initiated by a switchover of unit $A_N$. The first of these further transitions then cancels the identification code of unit $A_N$ previously inscribed in memory cell $h(AB)$ whereas the code of the second one is subsequently entered in that cell. At the end of the test period, when unit $A_N$ is again monitored, its code will not correspond to the one stored in cell $h(AB)$ so that comparator CM again registers a mismatch and a signal appears on lead 24.

The logic of FIG. 6 will have to be slightly modified in a situation as described with reference to FIG. 2 where the test period begins only a certain time after the initial switchover. This may include the provision of a third output lead of coder TE whose energization prior to the test period prevents the inscription of the identity of a follower unit (e.g. $B_L$) in memory half MA2.

Changes in the test period $t_Y$ can be made by adjusting the counters CT, possibly automatically in response to variations in the traffic pattern or in ambient conditions. Sensors SN (FIG. 4) explored by scanner SC may be of any conventional type capable of coacting, under TDM conditions, with the exchange equipment to be monitored.

I claim:

1. A method of ascertaining the participation of temporarily coacting operating units intervening in the establishment of a connection in a telecommunication system, said coacting units being part of respective groups of substantially identical units belonging to different classes of equipment, comprising the steps of:
monitoring the units of a first group for detecting a change of state in any one unit of said first group;
monitoring the units of a second group, any of them operatively associable with any unit of said first group, for detecting a change of state in any one unit of said second group with a predetermined timing relative to a detected change of state in any one unit of said first group; and
registering only the identities of the units of said first and second groups in which changes of state are detected with said predetermined relative timing.

2. A method as defined in claim 1 wherein said relative timing consists in the occurrence of a change of state of a unit of said second group within a predetermined test period following a detected change of state of a unit of said first group.

3. A method as defined in claim 2 wherein the registration of said identities is canceled upon detection of a change of state of another unit of either of said first and second groups within said test period.

4. A network for the surveillance of equipment in a telecommunication system provided with several classes of operating units forming part of a plurality of different groups of substantially identical units, any unit of a first group being operatively associable with any unit of a second group temporarily coacting therewith in the establishment of a connection requiring consecutive switchovers of a unit of said first group and a unit of said second group selected for joint intervention in said connection, comprising:
first monitoring means connected to the units of said first group for detecting a switchover of any unit of said first group;
second monitoring means connected to the units of said second group for detecting a switchover of any unit of said second group;
timing means responsive to said first monitoring means for establishing a predetermined test period upon detection of a switchover in any unit of said first group;
recognition means connected to said first and second monitoring means and to said timing means for identifying a selectively intervening first unit in said first group and a selectively intervening second unit in said second group only upon the occurrence of a switchover of said second unit within said test period following a switchover of said first unit; and
register means connected to said recognition means for receiving therefrom the identities of the selectively intervening units so identified.

5. A network as defined in claim 4 wherein said first and second monitoring means comprises a multiplicity of sensors, one for each unit of each group, and scanning means for cyclically exploring said sensors, said timing means comprising a like multiplicity of counters respectively assigned to said sensors and cyclically connectable thereto by said scanning means for counting successive cycles in the absence of a switchover in the corresponding units and for resetting by such a switchover.

6. A network as defined in claim 5, further comprising integrating means and change-detecting means inserted in cascade between said scanning means and said counters.

7. A network as defined in claim 5 wherein said recognition means has inputs connected to said scanning means and said counters for receiving therefrom signal configurations including identification codes for said units, switchover signals and timing information, said recognition means comprising first and second storage means for temporarily registering the identities of units from said first and second groups in response to signal configurations indicative of a switchover, said register means being connected to said storage means.

8. A network as defined in claim 7 wherein said first and second storage means are provided with a plurality of cell pairs respectively assigned to different combinations of operatively associable groups, said recognition means further comprising a memory with data adapted to be called out by said signal configurations for loading a cell pair assigned to said first and second groups in response to a switchover involving a unit of either of the last-mentioned groups.

9. A network as defined in claim 8 wherein said recognition means further comprises logical circuitry connected to said memory and to said first and second storage means for determining from the contents of the assigned cell pair the occurrence of switchovers in more than one unit of either of said last-mentioned groups during said test period, said circuitry being provided with output means extending from said storage means to said register means for reading out the identities registered in the assigned cell pair only in the absence of a switchover of another unit during said test period.

10. A network as defined in claim 9 wherein said cell pairs are provided with storage elements for the entry of discriminating bits from said circuitry inhibiting the read-out of the registered identities therefrom.

11. A network as defined in claim 7 wherein each of said counters has a limited counting capacity, said timing information including a signal emitted by any of said counters upon attainment of a full count to indicate the end of a test period.

12. A network as defined in claim 11 wherein said recognition means includes a coder connected to said counters for converting the counts thereof into binary signals indicating the beginning and the end of a test period.

* * * * *